United States Patent [19]
Sasamoto

[11] Patent Number: 6,034,830
[45] Date of Patent: Mar. 7, 2000

[54] INFORMATION RECORDING MEDIUM HAVING DIVIDED CYLINDER ADDRESS STORAGE

[75] Inventor: Tatsuro Sasamoto, Kawasaki, Japan

[73] Assignee: Fujitsu Limited, Kawasaki, Japan

[21] Appl. No.: 08/789,122

[22] Filed: Jan. 27, 1997

[30] Foreign Application Priority Data

Mar. 15, 1996 [JP] Japan ..................................... 8-059430

[51] Int. Cl.⁷ .............................. G11B 5/09; G11B 5/596
[52] U.S. Cl. ........................... 360/48; 360/49; 360/77.08; 360/78.14
[58] Field of Search ........................... 360/48, 49, 78.14, 360/77.08, 75, 73.14, 73.03; 364/44.13; 395/183.18, 500, 652; 711/3, 114

[56] References Cited

U.S. PATENT DOCUMENTS

| | | | |
|---|---|---|---|
| 5,589,998 | 12/1996 | Yu | 360/78.14 |
| 5,666,238 | 9/1997 | Igari et al. | 360/78.14 |
| 5,694,600 | 12/1997 | Khenson et al. | 395/652 |

FOREIGN PATENT DOCUMENTS

| | | |
|---|---|---|
| 376055 | 4/1991 | Japan . |
| 5114147 | 5/1993 | Japan . |
| 7105628 | 4/1995 | Japan . |
| 7176140 | 7/1995 | Japan . |
| 7211006 | 8/1995 | Japan . |

*Primary Examiner*—Nabil Hindi
*Assistant Examiner*—Regina Y. Neal
*Attorney, Agent, or Firm*—Greer, Burns, & Crain Ltd.

[57] ABSTRACT

The present invention relates to an information recording medium for a disk drive having improved recording efficiency. The information recording medium is provided with discrete servo and data areas, with servo information being recorded in the servo areas. Cylinder information included in one or more servo areas is used to locate particular data areas on a disk. In the present invention at least partial cylinder information in one servo area is used to locate more than one data area by dividing the cylinder information into different servo areas, or using the cylinder information in one servo area to locate a data area associated with another servo area. By recording the divided cylinder information in respective ones of the servo areas provided on a given cylinder on the disk, less disk space is needed for cylinder information, so the size of the data areas can be increased and recording efficiency can be improved.

10 Claims, 6 Drawing Sheets

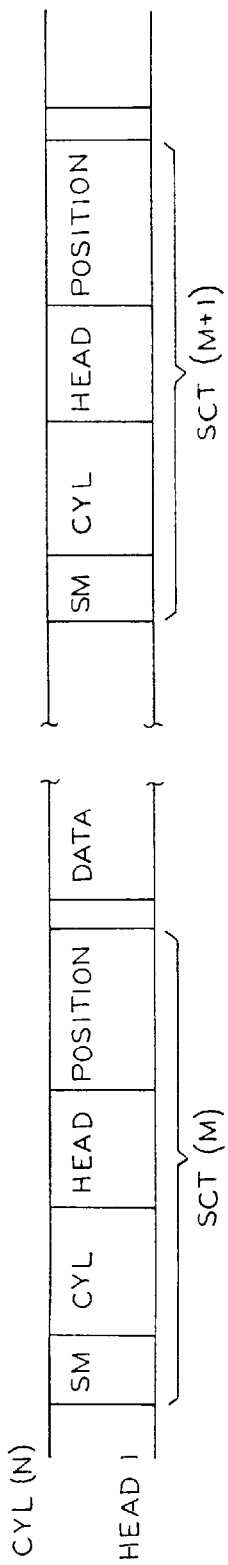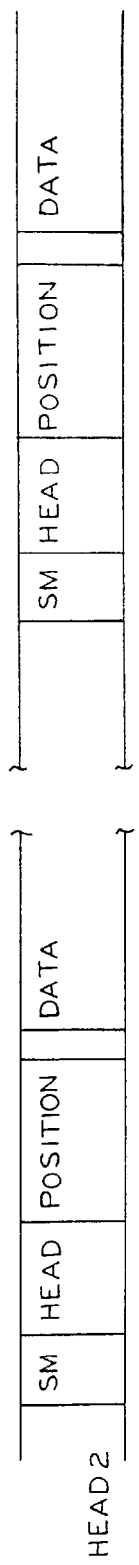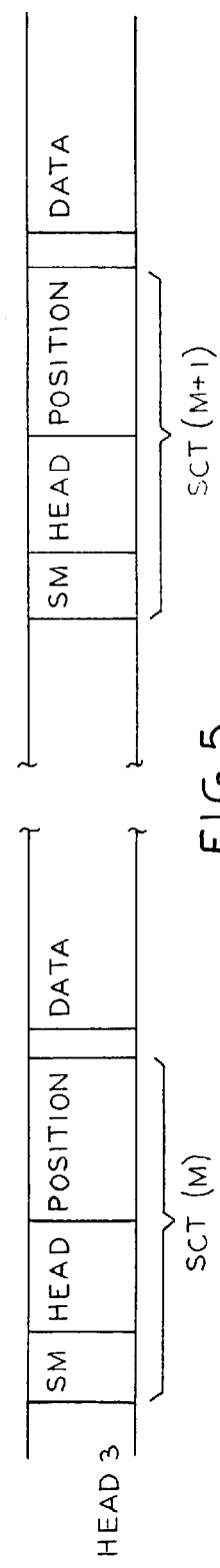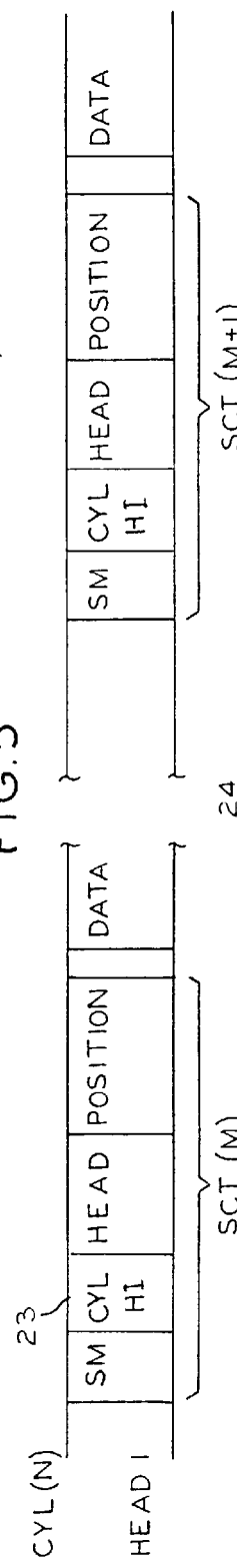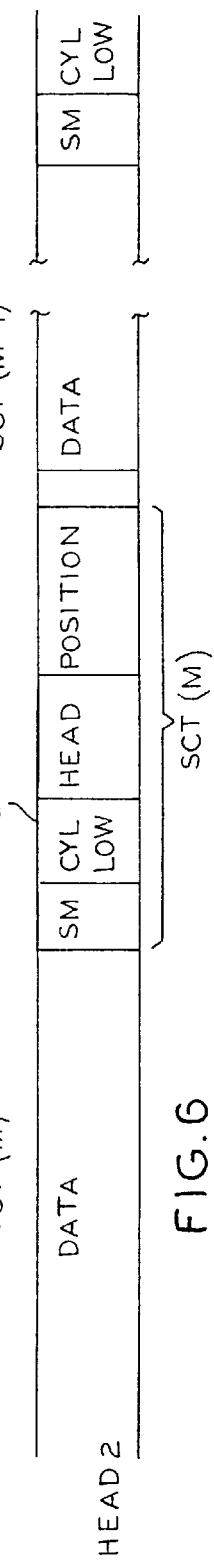
FIG.5
FIG.6

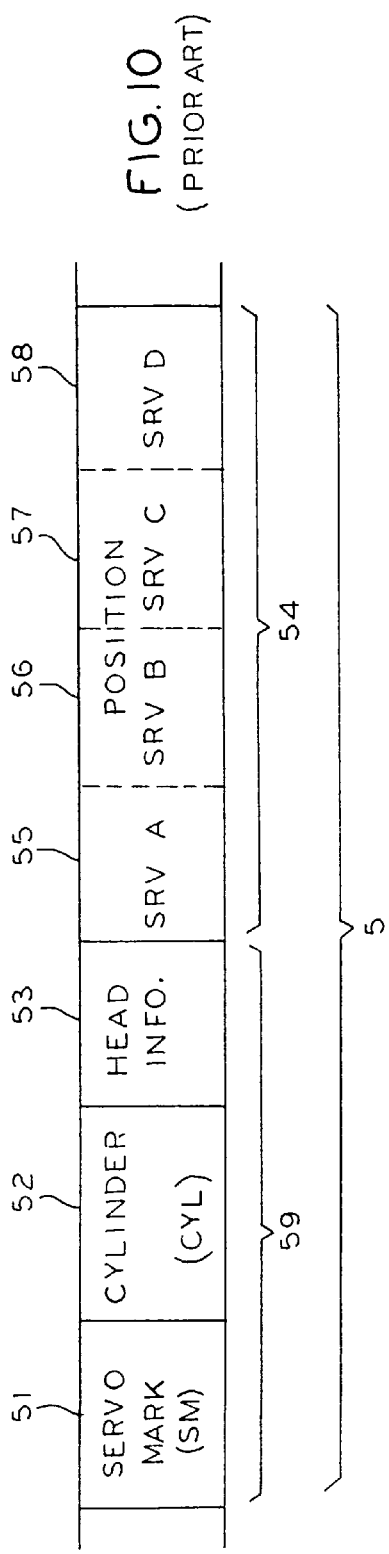
FIG. 10 (PRIOR ART)
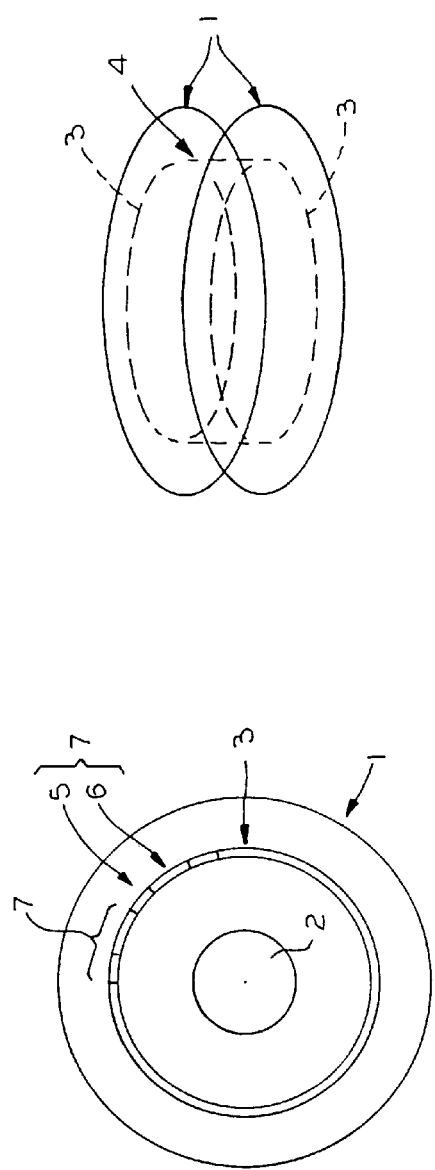
FIG. 11B (PRIOR ART)
FIG. 11A (PRIOR ART)

INFORMATION RECORDING MEDIUM HAVING DIVIDED CYLINDER ADDRESS STORAGE

The present invention generally relates to an information recording medium used in a disk drive, and more particularly, to an information recording medium having increased recording efficiency by using less space for servo information and thus more space for data.

BACKGROUND OF THE INVENTION

A magnetic disk drive generally includes a magnetic disk (recording medium) and at least one magnetic head(s) positioned to face the magnetic disk. As the magnetic disk is rotated at a high speed, the magnetic head is driven in a radial direction of the magnetic disk using a driving unit so that data is recorded at predetermined positions on the magnetic disk.

As shown in FIG. 11(A), a plurality of concentric tracks 3 for registering data are formed around a shaft 2 for a magnetic disk 1 (in FIG. 11(A), only one track 3 is shown). As shown in FIG. 11(B), a stack of magnetic disks 1 is normally provided on the shaft 2 (FIG. 11(A)). Two magnetic heads (not shown) positioned opposite to each other sandwich each magnetic disk 1 (FIG. 11(B)).

The plurality of magnetic heads are moved together by driving means such as a voice coil motor (VCM). Corresponding tracks 3 on the disks 1 form a cylinder 4. Each of the tracks 3 (FIG. 11(A)) is divided into a plurality of sectors 7. Each of the sectors 7 has a servo area 5 (servo sector) in which servo information necessary for the seek operation is recorded, and a data area 6 (data sector) in which data is recorded by a user of the magnetic disk drive.

FIG. 10 shows a format of servo information recorded on a conventional servo sector 5. The servo information recorded in the servo sector 5 is used for radial positioning of a magnetic head to a desired track or cylinder, and for detecting circumferential positions of the magnetic head within the selected track. As shown in FIG. 10, servo information recorded in one servo sector includes address information 59 including a servo mark 51 (SM), cylinder information 52 (CYL), and head information 53. The servo information also includes position information 54 (POSITION).

The servo mark 51 is provided to distinguish the servo sector 5 from the previous data sector 6. The cylinder information 52 specifies a cylinder address. Specifically, gray codes are used to record the cylinder information 52 in order to prevent an erroneous reading of cylinder information from occurring.

The head information 53 is embodied by an identification number for a head used to process the track. Therefore, the head information 53 remains the same for a given track. The position information 54 includes servo A 55, servo B 56, servo C 57, and servo D 58, and is used to generate signals indicating positions between tracks.

Though not illustrated, the data sector 6 includes an ID field and a data field. The data field is used as a data area in which data is recorded by the user of the magnetic disk. A portion of the servo information including the cylinder information and the head information is recorded in the ID field.

Conventionally, the full cylinder information is recorded in the ID field of the data sector 6, and only a low-order portion of the cylinder information is recorded in the area in the servo sector 5 reserved for the cylinder information (CYL). Therefore, in the conventional magnetic disk drive, the position of the magnetic head is determined before the read/write operation based on the cylinder information recorded in the ID field of the data sector 6.

The ID field in the data sector 6 makes it possible to obtain cylinder information even when the magnetic head is not aligned with the center of recorded data. Recently, however, the ID field tends to be eliminated from the data sector 6 in the magnetic drive in order to provide more efficient data recording, that is, for improved density of data recording. In this case, the position of the magnetic head is determined before the read/write operation based on the servo information recorded in the servo sector 5.

In an approach in which the position is determined before the read/write operation using the servo information, it is necessary to record the full-bit servo information in the area in the servo sector 5 reserved for the cylinder information (CYL).

As the track pitch becomes smaller due to increased recording density, the number of tracks formed on the magnetic disk 1 increases and the number of cylinders increases. Accordingly, it is necessary to expand the area reserved for the cylinder information (CYL). Specifically, given 3,000 cylinders in the conventional magnetic disk, the capacity of the area reserved for the cylinder information (CYL) is 12 bits. As the number of cylinders increases to 10,000 as a result of improved recording density, the capacity of 14 bits is required for the cylinder information.

As the number of cylinders increases, the volume of cylinder information increases. In an approach in which the full-bit cylinder information is recorded in each of the servo sectors 5, the area reserved for cylinder information grows significantly, resulting in a reduction in the size of the area available for recording data, and a consequent reduction in recording efficiency.

Accordingly, an object of the present invention is to provide an information recording medium and an information recording device in which recording efficiency is improved.

SUMMARY OF THE INVENTION

An information recording medium for a disk drive according to one embodiment of the present invention has at least one magnetic disk having a plurality of sectors, each sector having a servo information area followed by a data area, where each sector is identified and located by address information in one or more of the servo information areas. Address information in one of the servo areas is used to locate more than one sector. This aspect of the present invention facilitates an increase in the data recording efficiency by recording cylinder information only in predetermined servo area(s), allowing an overall reduction in the size of the other servo areas in which no cylinder information is recorded. The size of the data areas used for storing user data can be increased by an amount corresponding to the reduction in size of the servo areas, thus increasing the ratio of areas available for user data to areas required for servo data.

According to another aspect of the present invention, the address information for a particular sector is divided into a plurality of portions, at least one of which is recorded in the particular sector.

According to another aspect of the present invention, the address information is divided and recorded in respective ones of a plurality of servo areas provided on a given cylinder. The divided cylinder information is read by a head and demodulated by the reproducing means so that the original cylinder information is reproduced.

According to still another aspect of the present invention, the address information for a particular sector is divided into a high order portion (CYL HI) and a low order portion (CYL LO), either of which is recorded in the particular sector. According to another aspect of the present invention, the other of the high order portion or the low order portion is recorded in an adjacent sector.

According to yet another aspect of the present invention, the low-order cylinder information is stored in a location on the disk such that it can be read immediately after the high-order cylinder information is read, reducing the time required to read the entirety of the cylinder information divided into the high-order cylinder information and the low-order cylinder information. Thus, the time required for the seek operation can be reduced.

According to another aspect of the present invention, the sectors in the magnetic disks are staggered with respect to each other so that corresponding sectors on the magnetic disks are not aligned. In this manner, the recording positions of a succession of the divided cylinder information recorded on respective tracks processed by respective heads are relatively close to each other. Thus, it is possible to reduce the time required for reading the entirety of the cylinder information and to reduce the time required for the seek operation.

According to still another aspect of the present invention, all of the address information for a number of selected sectors is stored in another one of the sectors, so that none of the address information is stored in the other sectors.

According to another aspect of the present invention, information indicating an order of the divided address information is recorded before an area reserved for a body portion of the divided address information. By writing information indicating the order of the cylinder information in an area preceding the body portion of the cylinder information, it is possible to speedily and reliably demodulate the cylinder information. Thus, the time required for the seek operation can be reduced and the reliability thereof can be improved.

According to another aspect of the present invention, the high-order cylinder information is recorded on a track processed by a first head of a plurality of heads for processing respective tracks, and the low-order cylinder information is recorded on a track processed by a second head.

According to another embodiment of the present invention, the information recording device has at least one magnetic disk having a plurality of cylinders, each cylinder having a plurality of discrete servo areas for storing data bits indicating servo information. The data bits are divided into a plurality of bit groups, with each of the bit groups being recorded in a respective one of the plurality of servo areas. A head is provided for reading a plurality of bit groups or divided address information stored in respective ones of a plurality of servo areas on the information recording medium. Reproducing means demodulate the plurality of bit groups or divided address information read by the head so as to reproduce the bit group or address information, and head driving means translate the head to a position that corresponds to the bit group or address information, based on the bit group or address information reproduced by the reproducing means.

BRIEF DESCRIPTION OF THE DRAWINGS

FIG. 5 is a diagram showing a data format of servo sectors recorded according to a fifth embodiment of the present invention;

FIG. 6 is a diagram showing a data format of servo sectors recorded according to a sixth embodiment of the present invention;

FIG. 10 is a diagram showing a data format of a conventional servo sector; and

FIGS. 11(A) and 11(B) are diagrams which shows a conventional servo information recording method in a disk drive.

DETAILED DESCRIPTION

A description will now be given, with reference to the drawings, of the embodiments of the present invention. In the following description, it is assumed that the present invention is applied to magnetic disks and magnetic disk drives.

Figure 7:
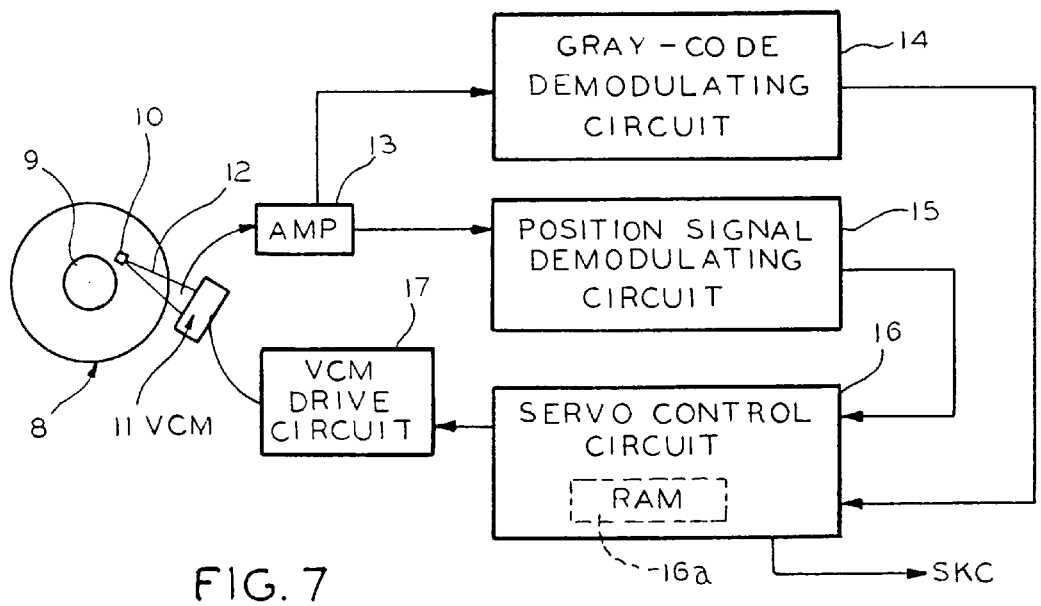
FIG. 7 is a diagram showing a part of a magnetic disk drive used to practice the servo information recording method of the present invention.

FIG. 7 shows a portion of a magnetic disk drive, and includes a block diagram of a servo circuit for the drive. A magnetic disk 8 has a magnetic substance applied on an upper major surface and a lower major surface of a disk-shaped substrate so that two recording surfaces are available. A stack of magnetic disks 8 (FIG. 7 only shows the topmost magnetic disk 8) is coaxially fitted to a shaft 9 of a spindle motor. Each of the magnetic disks 8 is rotated at a high speed.

A plurality of magnetic heads (only one shown) 10 are provided such that each of the heads 10 faces one recording surface of one magnetic disk 8. Each head 10 is provided at an end of an arm 12 connected to a voice coil motor (hereinafter, simply referred to as a VCM) 11. The arm 12 extends to a position above the upper major surface and the lower major surface of the magnetic disk 8 so that the magnetic disk 8 is sandwiched by a pair of heads 10. The heads 10 are driven in a radial direction of the magnetic disk 8 using the VCM 11.

Figure 1:
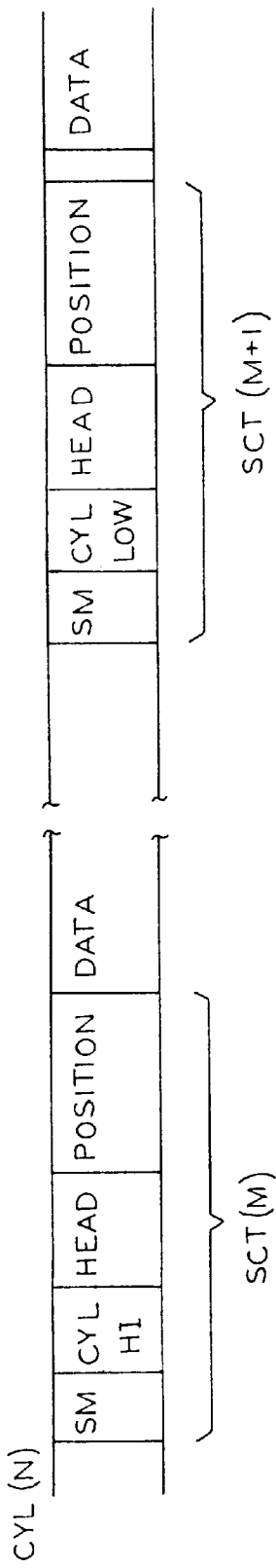
FIG. 1 is a diagram showing a data format of servo sectors recorded according to a first embodiment of the present invention.
Figure 2:
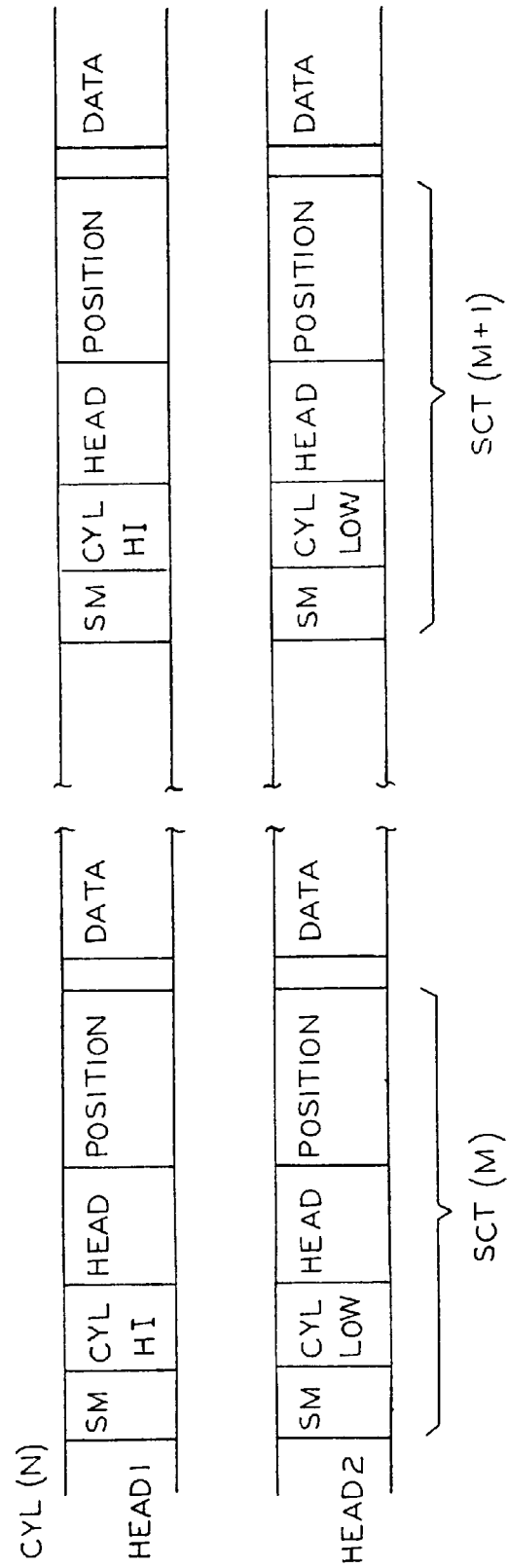
FIG. 2 is a diagram showing a data format of servo sectors recorded according to a second embodiment of the present invention.
Figures 3, 4:
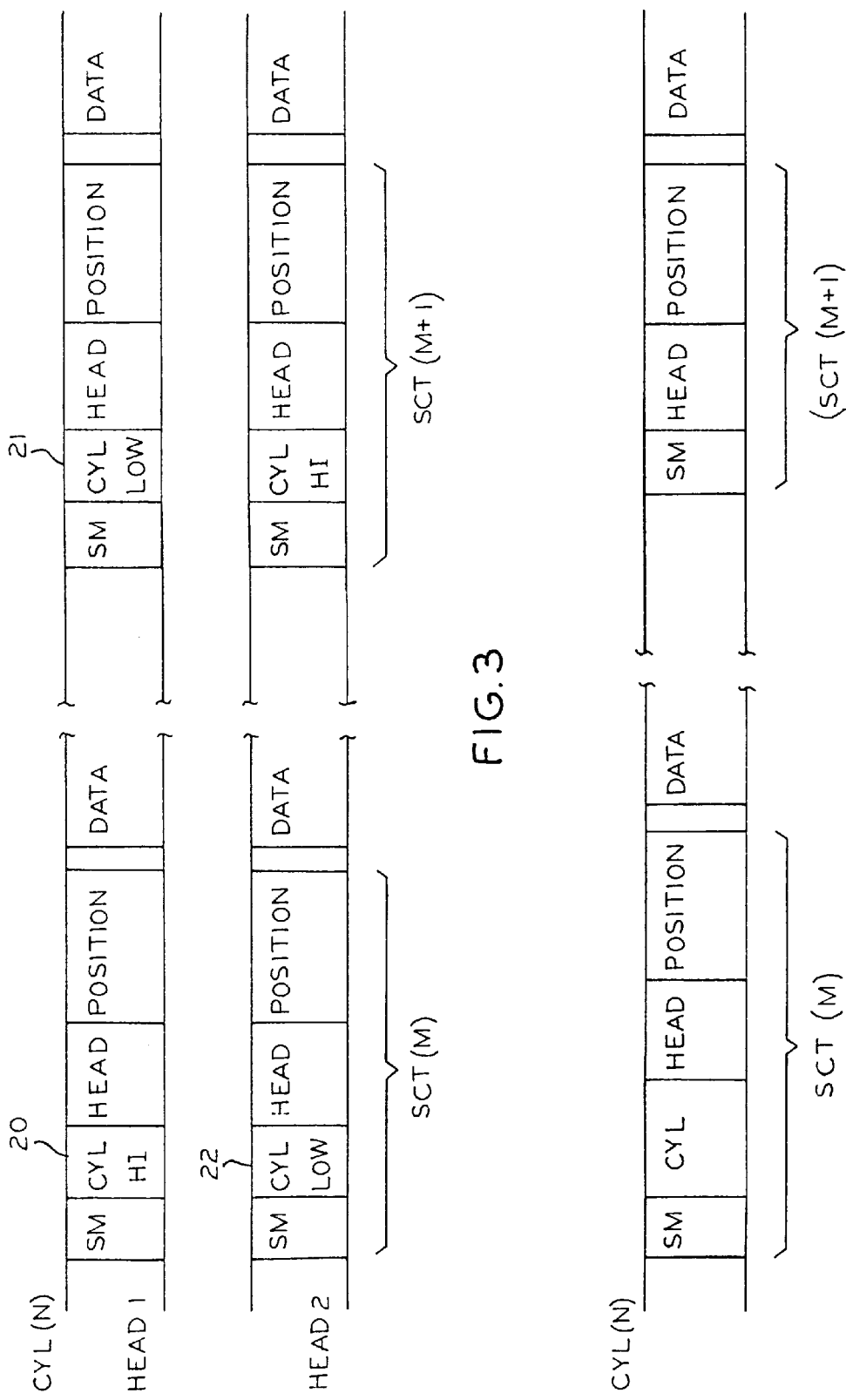
FIG. 3 is a diagram showing a data format of servo sectors recorded according to a third embodiment of the present invention.
FIG. 4 is a diagram showing a data format of servo sectors recorded according to a fourth embodiment of the present invention.

FIGS. 1 and 4 show data formats for a single head. While FIGS. 2, 3, 5 and 6 show data formats for a plurality of heads, the number of heads shown is only two or three. Individual heads 10 are identified in those figures by the notation HEAD 1–HEAD 3.

In the magnetic disk 8, a plurality of tracks (for example 10,000 tracks) are formed, so that a plurality of cylinders (10,000) are formed in the stack of disks. Each track has servo sectors that serve as servo areas, and data sectors that serve as data areas. A description of the areas will be given later.

Referring again to FIG. 7, servo information recorded in the magnetic disk 8 is converted into electric signals by the head 10. The signal obtained by this conversion is amplified by an amplifying circuit (AMP) 13 and fed to a gray-code demodulating circuit 14 and a position signal demodulating circuit 15.

The present invention includes the conventional approach in that the servo information is composed of cylinder information, head information, and position information. The cylinder information and the head information are recorded using gray codes for the purpose of reducing chances of the information being erroneously read. The gray-code demodulating circuit 14 demodulates the cylinder information and the head information recorded using gray codes, into binary codes. The position information, which is recorded as an analog signal, is demodulated by the position signal demodulating circuit 15.

The cylinder information and the head information demodulated by the gray-code demodulating circuit 14, and the position information demodulated by the position signal demodulating circuit 15 are fed to a servo control circuit 16, where a position determination process for the seek operation is executed. The servo control circuit 16 drives the head 10 based on the position of the head 10 using a RAM 16a, and issues a seek terminating signal SKC when a target track is reached.

Specifically, the servo control circuit 16 outputs a drive signal to a VCM drive circuit 17. The VCM drive circuit 17 drives the VCM 11 in accordance with the drive signal so as to move the head 10 to the target track.

A description will now be given of the servo information recorded on the magnetic disk 8 of the magnetic disk drive 7 having the above-described construction.

FIGS. 1 through 6 show data formats of the servo information recorded on the magnetic disk 8 according to various embodiments. Each of the figures shows a portion of an Nth cylinder (indicated as CYL (N)) out of a plurality of cylinders formed on the magnetic disk 8.

In each of the figures, a servo sector is indicated by SCT. Thus, SCT (M) indicates an Mth servo sector on a given track; SCT (M+1) indicates an M+1th servo sector on the track, etc. A data sector is indicated by DATA. Data bits carrying servo information are recorded in the servo sector SCT. Data bits carrying information input by the user of the magnetic disk drive 7 are recorded in the data sector DATA. A servo mark for distinguishing the servo sector SCT from the data sector DATA is indicated by SM, and cylinder information is indicated by CYL.

As described earlier, the cylinder information indicates a cylinder address, and is recorded using gray codes to reduce the chance of the cylinder information being read erroneously. A detailed description of the cylinder information will be given later in the description of each embodiment.

Head information indicating a head number applied to a given track is indicated by HEAD. The head information remains the same for a given track. The head information HEAD is also recorded using gray codes in order to reduce the chance of the head information being read erroneously.

Position information is indicated by POSITION. Like the conventional position information depicted in FIG. 10, the position information according to the present invention is composed of servo A 55 (SRV A)–servo D 58 (SRV D), and is used to generate signals indicating positions between tracks. The servo mark SM, the cylinder information CYL, and the head information HEAD constitute address information.

A description will first be given, with reference to FIG. 1, of the data format of the servo sector recorded on the magnetic disk 8 according to the first embodiment. In the magnetic disk 8 according to the first embodiment, the cylinder information CYL recorded in the servo sector SCT is divided so that each divided information resides in a respective servo sector of the plurality of servo sectors formed on the cylinder CYL (N) of the magnetic disk 8.

According to the first embodiment, the cylinder information CYL is divided into high-order cylinder information (CYL HI) and low-order cylinder information (CYL LOW). The high-order cylinder information is recorded in the Mth servo sector SCT (M) and the low-order cylinder information is recorded in the M+1th servo sector SCT (M+1).

Specifically, when there are 10,000 cylinders, an area total of 14 bits should be reserved for the cylinder information. The first embodiment ensures that the higher 7 bits of the cylinder information CYL is recorded in the Mth servo sector SCT (M) as the high-order cylinder information (high-order CYL) and the lower 7 bits of the cylinder information is recorded in the M+1th servo sector SCT (M+1) as the low-order cylinder information (low-order CYL).

According to the first embodiment, it is possible to reduce the amount of cylinder information recorded in individual servo sectors SCT. Given that the full-bit cylinder information CYL contains 14 bits, the cylinder information recorded in the servo sector SCT (M) and the servo sector (M+1) each contains only 7 bits. Accordingly, it takes less time to process individual servo sectors. Moreover, it is possible to increase the size of the data sector DATA and to improve the recording efficiency.

Additionally, since the sectors in which the divided cylinder information (the high-order CYL and the low-order CYL) are written belong to the same cylinder, there is no need to read cylinder information CYL from different cylinders during a seek operation. Therefore, the read operation can be performed rapidly and accurately. Also, the circuitry for demodulating the cylinder information, as the cylinder information is read, can be simplified.

In further accordance with the first embodiment, the cylinder information CYL can be recorded only in the servo sector SCT, and not in the data sector DATA. With this construction, the size of the data sector can be increased so that the data recording density can be improved.

In an alternative approach to the first embodiment, information indicating the order of the cylinder information may be written in the servo sector SCT to precede the body portion of the high-order CYL HI and the low-order CYL LOW, that is, between the servo mark SM and the cylinder information.

In this way, speedy and reliable demodulation of the cylinder information and the synthesis of the high-order CYL HI and the low-order CYL LOW is possible, resulting in reduction of the seek time and improvement in the reliability of the seek operation. The construction described herein is particularly useful when the cylinder information is divided into a large number of parts.

When the cylinder information is divided into high-order portion CYL HI and low-order portion CYL LOW, and is recorded in respective servo sectors on the same cylinder CYL(N), there is a time difference between the time when the high-order portion CYL HI is read and the time when the low-order portion CYL LOW is read. Accordingly, the first embodiment uses the random access memory (RAM) 16a in the servo control circuit 16 so that the cylinder information can be temporarily stored. More specifically, when the reading of the high-order portion CYL HI precedes the reading of the low-order portion CYL LOW, the high-order portion CYL HI is stored in the RAM 16a and held therein until the low-order portion CYL LOW is read. Then, when the low-order portion CYL LOW is read, a synthesis of the high-order portion CYL HI and the low-order portion CYL LOW is executed.

One consequence of the cylinder information being divided into the high-order CYL HI and the low-order CYL LOW is that improper switching between the heads 10 may result in the same cylinder information being read multiple times. More specifically, switching of the head 10 after the high-order portion CYL HI has been read may cause the high-order portion CYL HI to be read a second time. In order to prevent this from happening, the servo control circuit 16 may be provided with a checking function which ensures that the synthesis process is suspended when it is found that the high-order portion CYL HI is the same as the cylinder information stored in the RAM 16a.

A description will now be given, with reference to FIG. 2, of the data format in the magnetic disk 8 according to the second embodiment. In the second embodiment, the cylinder information is divided into two parts as in the first embodiment. The high-order CYL HI and the low-order CYL LOW are recorded using different heads (HEAD 1 and HEAD 2) provided for the same cylinder. Referring to FIG. 2, the HEAD 1 writes the high-order CYL HI in the servo sectors SCT(M), SCT (M+1), etc., and HEAD 2 writes the low-order CYL LOW in the servo sectors SCT(M), SCT (M+1), etc. According to the second embodiment, HEAD 1 is always responsible for writing the high-order CYL HI in its servo sectors, and HEAD 2 is always responsible for writing the low-order CYL LOW in its servo sectors. With this arrangement, the high-order CYL HI and the low-order CYL LOW are written in different tracks of the same cylinder CYL (N). Like the first embodiment, the second embodiment ensures that cylinder information (the high-order CYL HI and the low-order CYL LOW) written in individual servo sectors SCT is half the size of the full-bit cylinder information. Thus, the amount of recorded information is reduced. Accordingly, it takes less time to process individual servo sectors. Moreover, it is possible to increase the size of the data sector DATA and to improve recording efficiency.

According to the second embodiment, the use of separate heads, HEAD 1 and HEAD 2 to read portions of the divided cylinder address information ensures that the high-order portion CYL HI and the portion low-order CYL LOW are distinguished from each other. Therefore, unlike the first embodiment, it is not necessary to write information indicating the order of the cylinder information in the magnetic disk 8. Accordingly, the size of the data sector DATA is increased.

A description will now be given, with reference to FIG. 3, of the data format in the servo sector on the magnetic disk according to a third embodiment of the present invention. Like the second embodiment, the third embodiment also ensures that the cylinder information is divided into two parts, and the writing of the high-order portion CYL HI and the low-order portion CYL LOW is executed using two heads HEAD 1 and HEAD 2. The difference from the second embodiment is that each of the heads HEAD 1 and HEAD 2 is capable of writing both the high-order portion CYL HI and the low-order portion CYL LOW in a given track.

A description of the magnetic disk drive 7 will be given again with reference to FIG. 7. As shown in FIG. 7, because the magnetic disk drive 7 usually has only one amplifying circuit 13, it is not possible to execute a reading process (reproduction process) using a plurality of heads 10 simultaneously. More specifically, a reading process using HEAD 2 is prevented while HEAD 1 is engaged in a reading process. The second embodiment is applicable to the magnetic disk 7 in which the head 10 can be used only selectively. By providing as many amplifying circuits 13 as the heads 10, it is possible to execute a reading process using a plurality of heads 10 simultaneously. The third embodiment is applicable to the magnetic disk drive 7 which permits simultaneous use of a plurality of heads 10.

By using the magnetic disk according to the third embodiment in the magnetic disk drive 7 having the above-described construction, the high-order portion CYL HI and the low-order portion CYL LOW can be simultaneously read using HEAD 1 and HEAD 2. With this arrangement, it is not necessary to wait, after the high-order CYL HI indicated by numeral 20 has been read, for the magnetic disk 8 to be rotated by a predetermined angle before reading the low-order portion CYL LOW, indicated by numeral 21. The high-order portion CYL HI 20 can be read by HEAD 1 at the same time that the low-order CYL LOW indicated by numeral 22 is being read by HEAD 2. Accordingly, it is possible to reduce the time required to read the high-order portion CYL HI and the low-order portion CYL LOW, reducing the time required for a seek operation.

A description will now be given, with reference to FIG. 4, of the data format in the servo sector on the magnetic disk according to a fourth embodiment of the present invention. In the fourth embodiment, the cylinder information CYL is recorded in a predetermined servo sector SCT (the servo sector SCT (M) shown in FIG. 4) out of a plurality of servo sectors formed in a given track on a given cylinder CYL (N). According to the fourth embodiment, the full-bit cylinder information CYL is recorded in the servo sector SCT (M). Since the cylinder information CYL is recorded only in the predetermined servo sector SCT (M), the capacity of the remaining servo sectors in which the cylinder information CYL is not recorded can be reduced, thus increasing the amount of available room for recording user data in those sectors.

A description will now be given, with reference to FIG. 5, of the data format in the servo sectors on the magnetic disk 8 according to a fifth embodiment of the present invention. In the fifth embodiment, the full-bit cylinder information CYL is recorded only in the track processed by a specific head (HEAD 1 in the case of this embodiment) out of a plurality of heads 10 (HEAD 1, HEAD 2 and HEAD 3) provided for a given cylinder CYL (N), and no cylinder address information is recorded in the tracks processed by the other heads. The full-bit cylinder information CYL is recorded in the servo sectors SCT (M) and SCT (M+1) of HEAD 1.

Since the cylinder information CYL is recorded only in the track processed by a specific head (HEAD 1) and not recorded in the servo sectors processed by the other heads (HEAD 2, HEAD 3), the size of the data sectors processed by the other heads (HEAD 2, HEAD 3) can be increased accordingly. Thus, the magnetic disk according to the fifth embodiment also ensures that the data recording efficiency is improved.

A description will now be given, with reference to FIG. 6, of the data format in the servo sector in the magnetic disk according to a sixth embodiment of the present invention. The magnetic disk 8 according to the sixth embodiment is basically the same as the disk of the second embodiment shown in FIG. 2, the difference being that the cylinder information CYL is recorded using a staggered sector scheme. As shown in FIG. 6, the staggered sector scheme is such that information is recorded at non-aligned positions in a plurality of tracks constituting a given cylinder.

In the sixth embodiment, the cylinder information is divided into the high-order portion CYL HI and the low-order portion CYL LOW. The high-order portion CYL HI is recorded on servo sectors formed on a track processed by HEAD 1, and the low-order portion CYL LOW is recorded on servo sectors formed on a track processed by HEAD 2. The tracks are processed such that when HEAD 1 has processed a servo sector SCT on the first track and starts processing a data sector DATA on the first track, HEAD 2 starts processing the servo sector SCT on the second track. Accordingly, the position in the track processed by HEAD 1 at which the servo sector SCT is registered is not aligned with the position in the track processed by HEAD 2 at which the servo sector is registered. In other words, a staggering of the sectors is provided. By recording the cylinder information using the staggered sector scheme, the recording positions of a succession of the cylinder information (the high-order portion CYL HI and the low-order portion CYL LOW) alternately recorded on the tracks processed by HEAD 1 and HEAD 2 respectively are relatively close to each other. More specifically, the high-order portion CYL HI recorded on the track processed by HEAD 1 and indicated by a numeral 23 in FIG. 6 is close to the low-order portion CYL LOW recorded on the track processed by HEAD 2 and indicated by a numeral 24. Accordingly, referring to FIG. 6, by switching from HEAD 1 to HEAD 2 after HEAD 1 has read the high-order CYL HI in order to cause HEAD 2 to read the low-order CYL LOW, it is possible to reduce the time required to read the entirety of the cylinder information and to reduce the time required for the seek operation.

Figure 8:
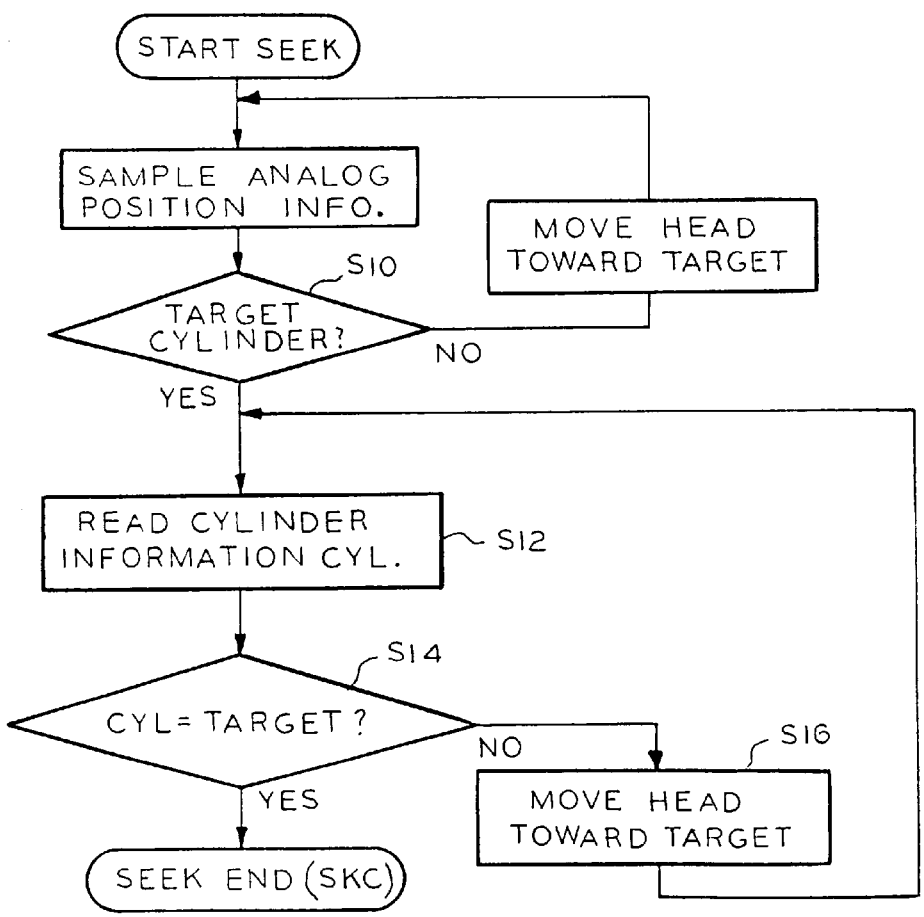
FIG. 8 is a flowchart showing a seek operation executed according to servo information recorded in accordance with the servo information recording method of the present invention.
Figure 9:
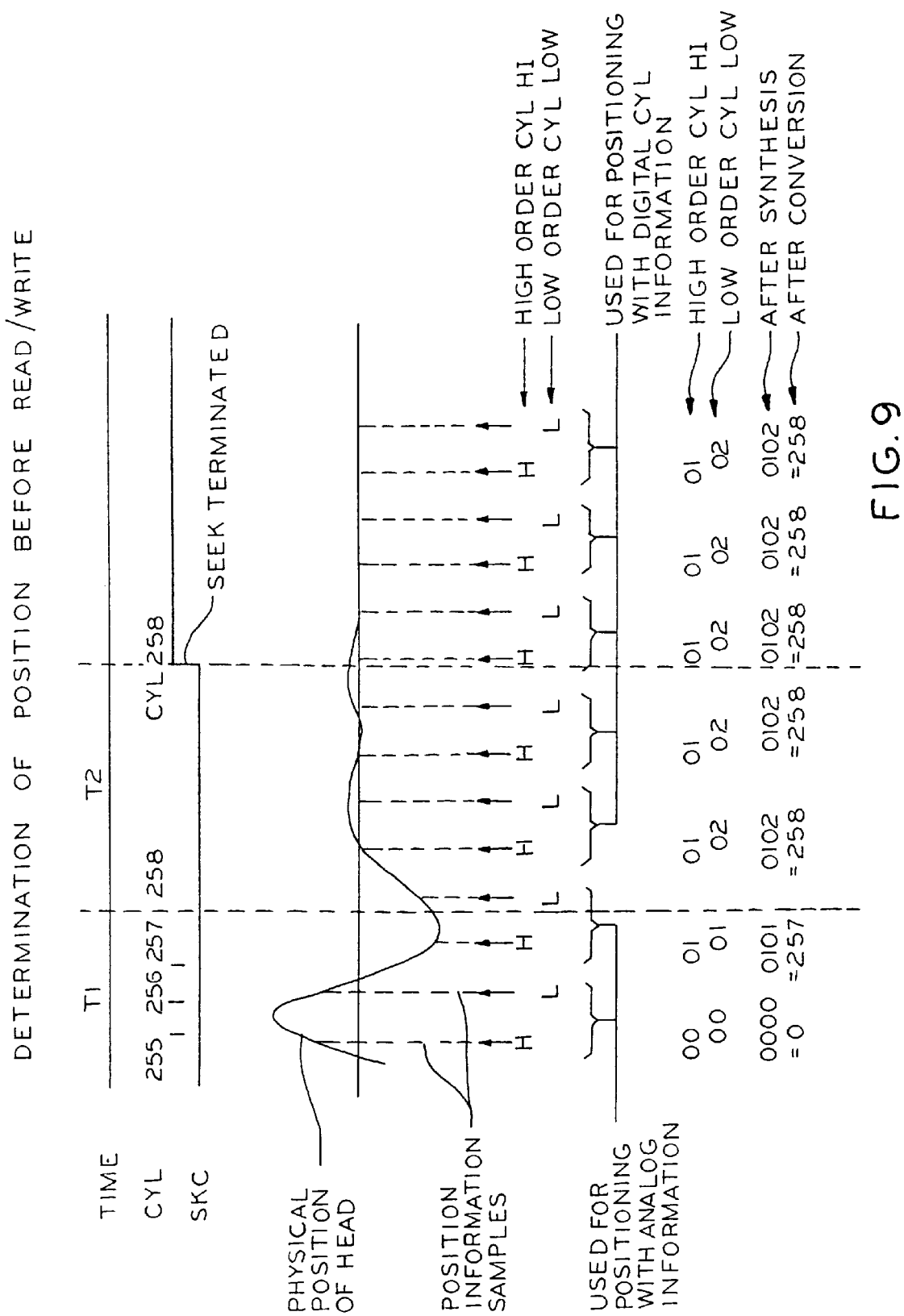
FIG. 9 is a timing chart showing a seek operation executed based on the servo information recorded in accordance with the servo information recording method of the present invention.

FIG. 8 is a flowchart showing a seek process executed in accordance with the servo information recorded on the magnetic disk according to the embodiments described above. FIG. 9 illustrates times at which the servo information is used to determine the position in the seek operation.

The seek process shown in FIG. 8 is executed by the servo control circuit 16 shown in FIG. 7. In the following description, the seek process in accordance with the servo information described in the first embodiment is taken as an example. In FIG. 9, it is assumed that the head 10 is eventually driven to a 258th cylinder (CYL 258). When the seek process shown in FIG. 8 is started, a determination is made in step S10 as to whether or not the current position of the head 10 is the target cylinder position, based on the read servo information. In step S10, the determination is based on the position information POSITION constituting the servo information. The position information POSITION is analog information which is less reliable than the cylinder information CYL. The head 10 is first led toward the target cylinder (CYL 258) using the position information POSITION. More specifically, the servo control circuit shown in FIG. 7 controls the VCM drive circuit 17 based on a position signal generated by the position signal demodulating circuit 15. The head 10 is moved toward the target cylinder position by the VCM drive circuit 17 driving the VCM 11. The process of step S10 is executed until the head 10 reaches the target cylinder position.

Time T1 in FIG. 9 generally indicates a period of time during which the process of step S10 is being executed. As shown in FIG. 9, as the head 10 is moved toward CYL 258 as a result of the seek operation, the physical position of the head 10 fluctuates. While the physical position of the head 10 fluctuates, an accurate cylinder position cannot be determined by reading the cylinder information CYL and demodulating it. Therefore, the seek operation is effected using the analog position information POSITION.

When it is determined in step S10 that the head 10 has reached the target cylinder position, the operation flow goes to step S12. Since the determination in step S10 may not be accurate, the head 10 may actually be displaced from the target cylinder even when an affirmative determination is given in step S10. Accordingly, in subsequent steps S12–S16, a more precise seek process is executed using the cylinder information CYL recorded in the respective tracks.

In step S12, the servo control circuit 16 reads the cylinder information CYL recorded using gray codes. As mentioned earlier, the servo information is divided into the high-order CYL HI and the low-order CYL LOW.

The gray-code demodulating circuit 14 demodulates the cylinder information into binary codes and generates the full-bit cylinder information CYL by synthesizing the divided information.

In step S14, a determination is made as to whether the cylinder information CYL synthesized in step S12 specifies the target cylinder number (CYL 258). When a negative determination is made in step S14, the operation flow goes to step S16, where the servo control circuit 16 moves the head 10 toward the target cylinder position.

Steps S12–S16 are executed until the cylinder information CYL generated in step S12 specifies the target cylinder number (CYL 258). When the target destination is specified, the seek operation is terminated. Referring to FIG. 9, steps S12–S16 are executed in the approximate period of time indicated by T2. The seek operation executed in steps S12–S16 is accurate because it is based on the cylinder information CYL. Dividing of the cylinder information CYL presents no problem because the gray-code demodulating circuit 14 is capable of properly synthesizing the divided information (the high-order CYL HI and the low-order CYL LOW).

The advantages of the invention are now apparent. By dividing information among sectors or using servo information in one sector to locate servo information in more than one sector, additional disk space is available for storing user-inputted data. In this manner, recording efficiency is increased.

While the description above with reference to FIG. 8 is based on the first embodiment, the same flow of operation for positioning the head 10 at a target cylinder position is applicable to the magnetic disk according to the second through sixth embodiments. The present invention is not limited to the above described embodiments, and variations and modifications may be made without departing from the scope of the present invention.

I claim:

1. An information recording medium for a disk drive, comprising:
    at least one magnetic disk having a plurality of sectors, each said sector having a servo information area followed by a data area, each said sector being identified and located by cylinder address information in one of more of said servo information areas, said cylinder address information in one of said servo areas being used to locate more than one said sector and being divided into only a high order portion and a low order portion, each said high and said low order portions having a plurality of bits, only one said portion being recorded in any one said particular sector, and each said high order portion having non-redundant data relative to a corresponding said low order portion.

2. The information recording medium of claim 1, wherein information indicating an order of the divided cylinder address information is recorded before an area reserved for a body portion of the divided cylinder address information.

3. The information recording medium of claim 1, wherein said, the high-order cylinder information being recorded on a track processed by a first head of a plurality of heads for processing respective tracks, and the low-order cylinder information being recorded on a track processed by a second head.

4. The information recording medium of claim 1, wherein said cylinder address information is recorded using a staggered sector scheme.

5. The information recording medium of claim 1 wherein the other of said high order portion or said low order portion is recorded in an adjacent sector.

6. The information recording medium of claim 1 comprising at least two of said magnetic disks, wherein said particular sector is in one of said disks, and the other of said high order portion or said low order portion is recorded in another one of said disks.

7. The information recording medium of claim 6 wherein, said sectors in said magnetic disks are staggered with respect to each other so that corresponding sectors on said magnetic disks are not aligned.

8. The information recording medium of claim 1 comprising at least two of said magnetic disks, said sectors in said magnetic disks being staggered with respect to each other so that sectors on said magnetic disks are not aligned.

9. The information recording medium according to claim 1, wherein only one said portion is located in any one said servo information area.

10. An information recording medium for a disk drive, comprising:

at least one magnetic disk having a plurality of sectors, each said sector having a servo information area followed by a data area; and cylinder address information used for identifying and locating more than one said sector, said cylinder address information being divided into a plurality of portions, each said portion having a plurality of bits and including nonredundant data relative to any other portion in said plurality of portions and only one said portion being stored in any one said servo information area.

* * * * *

UNITED STATES PATENT AND TRADEMARK OFFICE
CERTIFICATE OF CORRECTION

PATENT NO.    : 6,034,830
DATED         : March 7, 2000
INVENTOR(S)   : Sasamoto Page 1 of 1

It is certified that error appears in the above-identified patent and that said Letters Patent is hereby corrected as shown below:

<u>Column 11,</u>
Line 13, delete "said,"

Signed and Sealed this

Twenty-seventh Day of November, 2001

Attest:

*Attesting Officer*

NICHOLAS P. GODICI
*Acting Director of the United States Patent and Trademark Office*